United States Patent [19]

Gardner

[11] Patent Number: 5,462,554
[45] Date of Patent: Oct. 31, 1995

[54] EAR TAG APPLICATOR

[76] Inventor: Michael S. Gardner, 108 Waiatarua Road, Remuera, Auckland 1005, New Zealand

[21] Appl. No.: 185,994

[22] PCT Filed: Jul. 31, 1992

[86] PCT No.: PCT/GB92/01416

§ 371 Date: Mar. 31, 1994

§ 102(e) Date: Mar. 31, 1994

[87] PCT Pub. No.: WO93/02549

PCT Pub. Date: Feb. 18, 1993

[30] Foreign Application Priority Data

Aug. 1, 1993 [NZ] New Zealand .................... 239223

[51] Int. Cl.$^6$ ................................. A01K 11/00
[52] U.S. Cl. ................................. 606/117
[58] Field of Search .............. 606/1, 116, 117, 606/139, 142, 143, 205, 207; 40/300–302

[56] References Cited

U.S. PATENT DOCUMENTS

| | | | |
|---|---|---|---|
| 4,368,735 | 1/1983 | Filmer | 606/117 |
| 4,402,320 | 9/1983 | Filmer | 606/117 |
| 4,552,147 | 11/1985 | Gardner | 606/117 |
| 4,819,639 | 4/1989 | Gardner | 606/117 |

FOREIGN PATENT DOCUMENTS 0004221  9/1979  European Pat. Off. ............ 606/117

Primary Examiner—Stephen C. Pellegrino
Assistant Examiner—Glenn Dawson
Attorney, Agent, or Firm—Ladas & Parry

[57] ABSTRACT

An ear tag applicator having pivotally connected handles each having a jaw. One of the jaws has a tag engaging pin which is biased into a nearly perpendicular orientation with respect to the opposing jaw. A biasing spring allows the pin and the tag held thereby to pivot relative to the jaw at all times so that the device will not tear or rip the animals ear during its application.

6 Claims, 4 Drawing Sheets

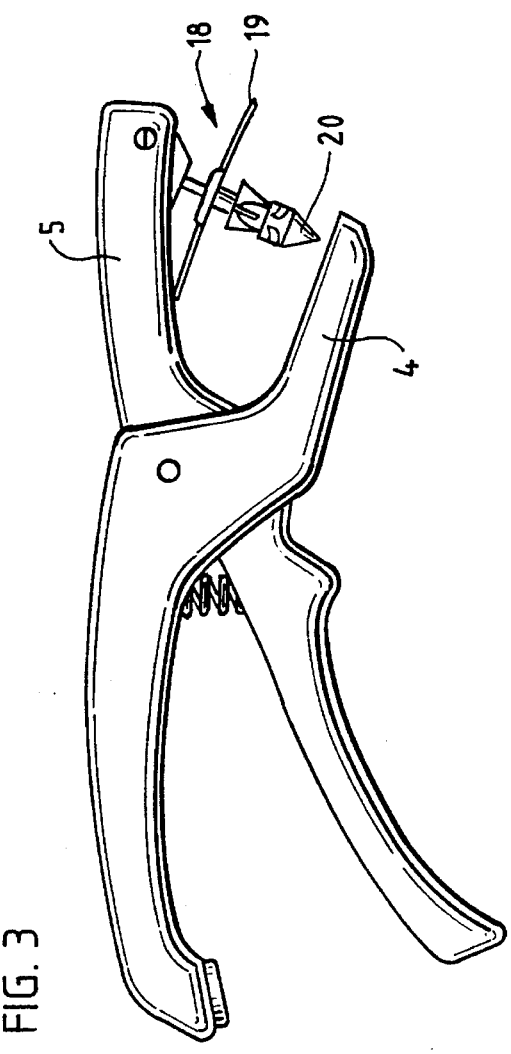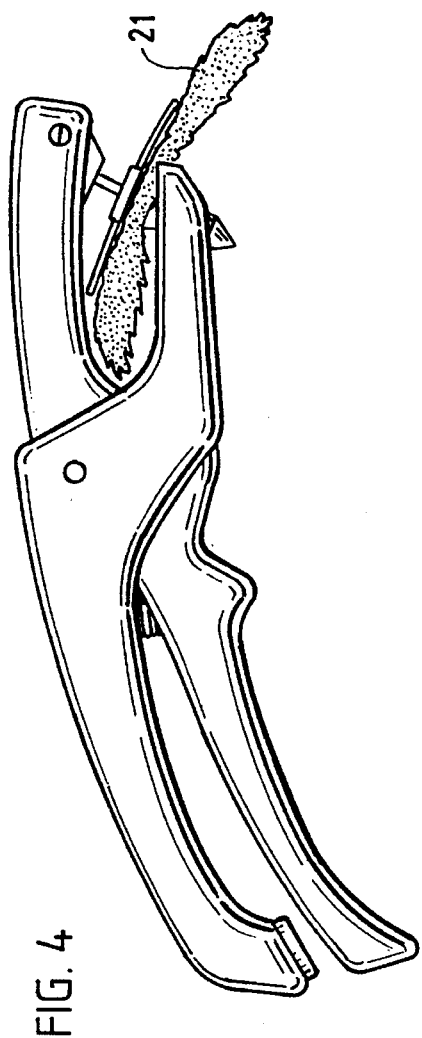
FIG. 3
FIG. 4

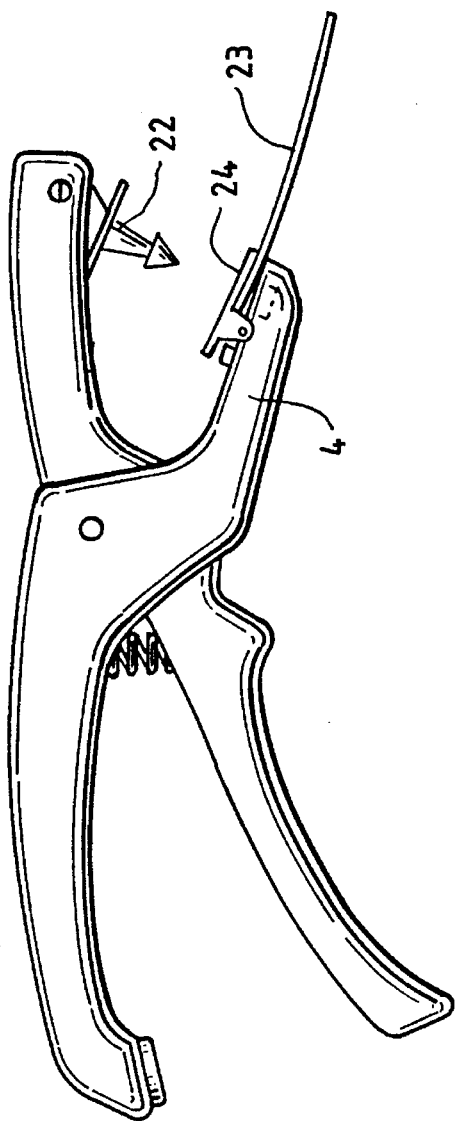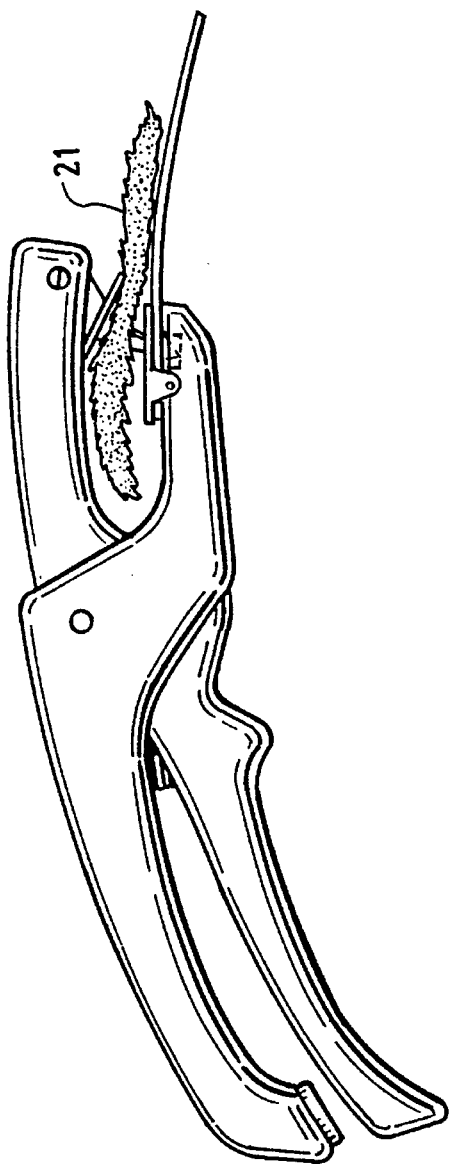

EAR TAG APPLICATOR

The present invention relates to an improved ear tag applicator.

More particularly, the present invention relates to an improved applicator for applying ear tags to animals whereby the ear tag engagement means is locked until the tag is inserted and whereupon it pivots away from the applicator upon insertion of the tag.

To the present time a wide range of ear tag applicators have been known. These generally consist of a pliers type of applicator, often of the trocar type, which usually involves a hand held appliance whereby in use a pin or blade pierces the animal's ear and then draws through the head of the ear tag. In such applicators the manner in which the blade or pin is positioned and directed is important. Prior art applicators have used a variety of means to achieve this including a relatively complex slidingly movable element within a housing as found in New Zealand Patent Specification No. 205008. Other applicators have utilised the use of mechanical retention means to keep the blade or pin in position prior to, during or after insertion of the ear tag.

The aforesaid applicators have tended to be complex and/or inefficient. It is an object of the present invention to address these difficulties.

According to one broad aspect of the invention there is provided an applicator for an animal ear tag including at least two pivotally connected handle members extending into or being attached to first and second jaws, and a driving means comprising a body portion and elongate tag engagement means characterised in that the driving means is pivotally connected adjacent one end of the first jaw member to enable the driving means to pivot about and relative to its pivotal attachment to the first jaw member.

According to another broad aspect of the invention there is provided an applicator tool for applying an ear tag to an animal comprising actuating means connected to upper and lower jaw means the said jaw means being movable towards and away from each other, driving means comprising a body portion and elongate tag engagement means wherein the tag engagement means is pivotable and the load on the tag engagement means is located below the point of pivot thereby restraining said tag engagement means in a first position and whereby said tag engagement means is pivotable away from the applicator to a second position once the ear tag has been applied to the animal.

In a preferred form of the invention the tag engagement means comprises a pin which in its first position is substantially diagonal to the upper and lower jaw means and is pivotable so as to lie in substantially the same plane as the upper jaw means upon insertion of an ear tag.

The driving means preferably consists of a body portion movable about a pivot wherein the said movement is determined by restraining means located around the said body portion and wherein biasing means assists to restrain the said driving means in a first position.

Further objects of the invention will become apparent from the following description which is given by way of example only of a preferred embodiment of the invention. Reference is made to the accompanying drawings wherein:

FIG. 1: is a side elevational view of a preferred form of the applicator tool according to the invention showing the driving means in a "cocked" position and showing part of the upper jaw means partially cut away;

FIG. 2: is again a partially cut away view of the applicator tool of FIG. 1 showing the driving means in a "spent" position;

FIG. 3: is a diagrammatic side elevational view of an applicator tool of FIG. 1 to illustrate the insertion of a one piece ear tag—prior to insertion of the ear tag;

FIG. 4: shows the insertion of the ear tag using the applicator shown in FIG. 3 upon insertion of the ear tag through an animal's ear;

FIG. 5: is an ear tag applicator as shown in FIG. 1 illustrated with a two piece ear tag;

FIG. 6: shows the applicator and ear tag of FIG. 5 upon insertion of the ear tag through an animal's ear.

The applicator of the present invention may be constructed according to the pliers type of applicator tool, as embodied in existing applicator tools. In FIG. 1, the applicator tool is referenced by Arrow 1. It has actuating means comprising upper handle 2 and lower handle 3. Upper handle 2 is integrally formed with lower jaw 4 and lower handle 3 is integrally formed with upper jaw 5. It will be appreciated that upon the closing of handles 2 and 3, upper jaw 5 and lower jaw 4 will be movable towards each other, and vice versa.

The cut away portion of upper jaw 5 discloses a hollow interior 6 within which are positioned various restraining means. The first is an "L" shaped restraining means 7 comprising an elongate base 8 and upstand 9. The other restraining means comprises an inverted "L" shaped restraining means 10 wherein the upstand 11 is substantially vertical.

The applicator tool has a biasing means 12 which is kept in tension by means of spacer 13.

The apparatus has a driving means 14 comprising a body portion 15, tag engagement means 16 and centrally located pivot 17.

It will be seen that body portion 15 has five sides—15a, which in the "cocked" position in which the driving means is located in FIG. 1, points downwardly, 15b to which is attached tag engagement means 16, side 15c which abuts against restraining means 7, side 15d which is in abutment with the free end of biasing means 12 and 15e which points towards the front of the applicator tool.

In the present position, for convenience referred to as the "cocked" position the driving means is retained in position by restraining means 7 and biasing means 12. When an ear tag is loaded onto the tag engagement means, which in a preferred embodiment is pin shaped, the driving means will be retained in "cocked" position by virtue of the fact that the tag engagement means is located rearward and below of the point of pivot. This means that a minimal biasing of biasing means 12 is required to keep the pin in the "cocked" position.

As an illustration of the manner of operation of the applicator tool reference is made to FIGS. 3 and 4 wherein a one piece ear tag is shown to be applied. The ear tag 18 is shown to have a body portion 19 and pointed head 20. FIG. 1 shows the applicator tool with the upper jaw 5 and lower jaw 4 in an open position and with the driving means in a "cocked" position. FIG. 4 shows the driving means still in a "cocked" position but with the sharpened head 20 having pierced an animal's ear 21.

FIGS. 5 and 6 illustrate the applicator tool applying a two piece ear tag wherein the male portion of the ear tag 22 is attached to the tag engagement means (not shown) and wherein the female portion of the ear tag 23 is attached to a tag holder means 24 spring loaded onto lower jaw 4.

FIG. 6 shows the same ear tag having pierced an animal's ear 21.

In all the above cases the driving means remains in a "cocked" position. It will be seen that upon completion of the above steps both handles 2 and 3 and jaws 4 and 5 will be in a closed position. Upon insertion of the tag through the animal's ear (or other skin) the tag engagement means will need to be removed from the ear tag/ear. This may be achieved by pulling the applicator tool away from the animal's ear or alternatively by the animal itself pulling away from the applicator tool.

Upon this occurring the tag engagement means 16 will pivot in the direction of arrow A. That is, from a substantially vertical to a substantially horizontal position as illustrated by position B of FIG. 2. In this position, conveniently referred to as the "spent" position, the sides of body portion 15 will be located as follows: 15a will be positioned upwardly and forwardly, 15b forwardly, 15c downwardly, 15d downwardly and rearwardly and 15e would be restrained by means of the restraining means 12. Further travel would be prevented by tag engagement means 16 striking the lower portion of restraining means 11.

It will be appreciated from the above that the tag engagement means of the present invention has a first "cocked" position and a second "spent" position, with the position being determined by the combined effect of the restraining means, biasing means and load placed on the tag engagement means itself. It will be seen that the movement of the driving means from the substantially vertical "cocked" position to the substantially horizontal "spent" position may be relatively simply and efficiently achieved with a minimum of movement and moving parts. This provides for a applicator tool having enhanced performance characteristics and one which provides greater ease of use for the person applying ear tags.

It will also be appreciated that the positioning of the tag engagement means is determined by a combination of factors as opposed to a specific restraining means which holds the body portion or tag engagement means in a fixed position until the tag is inserted.

Where in the foregoing description reference has been made to specific components or integers of the invention having known equivalents then such equivalents are herein incorporated as if individually set forth.

Although this invention has been described by way of example and with reference to possible embodiments thereof it is to be understood that modifications or improvements may be made thereto without departing from the scope or spirit of the invention.

I claim:

1. An applicator for an animal ear tag comprising at least two pivotally connected handle members, said handle members being movable between fully open and closed positions, first and second jaws being respectively attached to said at least two pivotally connected handle members, a driving means being pivotally connected adjacent an end of said first jaw, elongate tag engagement means connected to said driving means and pivotal therewith from a first position in which said elongate tag engagement means is directed generally towards said second jaw and at least partially directed away from a line perpendicular with said first jaw and adjacent said end of said first jaw, and a second or spent position in which said elongate tag engagement means is directed generally outwardly from said end of said first jaw, and biasing means to bias said elongate tag engagement means in said first position during movement of the first and second jaws towards each other, said elongate tag engagement means being free to pivot relative to said first jaw when said handle members are in said fully open position and said elongate tag engagement means is in said first position.

2. The applicator as claimed in claim 1 wherein said elongate tag engagement means comprises a pin which is pivotal with said driving means so as to lie substantially in a same axis as the first jaw in said second or spent position.

3. The applicator as claimed in claim 1 wherein said driving means includes at least two sides, and said biasing means is selectively in contact with one of the sides of said driving means as to bias respectively said driving means to the first and second positions.

4. The applicator as claimed in claim 1 wherein said second jaw is formed with a receiving place to locate one portion of a tag.

5. The applicator as claimed in claim 1 wherein spring means are provided to bias said handle members and said first and second jaws into a normal position in which said handle members are in said fully open position and said jaws are respectively spaced apart from one another.

6. The applicator as claimed in claim 1 wherein said elongate tag engagement means when in said position has a longitudinal axis which passes rearwardly of a pivot axis of said driving means from said end of said first jaw.

* * * * *

UNITED STATES PATENT AND TRADEMARK OFFICE
CERTIFICATE OF CORRECTION

PATENT NO. : 5,462,554
DATED : October 31, 1995
INVENTOR(S) : Michael S. Gardner It is certified that error appears in the above—identified patent and that said Letters Patent is hereby corrected as shown below:

Title page, Item: [30] Foreign Application Priority Data
    Delete "Aug. 1, 1993" and insert --Aug. 1, 1991--.

Signed and Sealed this

Twenty-eighth Day of May, 1996

Attest:

BRUCE LEHMAN

*Attesting Officer*     *Commissioner of Patents and Trademarks*

(12) EX PARTE REEXAMINATION CERTIFICATE (8489th)
United States Patent
Gardner

(10) Number: US 5,462,554 C1
(45) Certificate Issued: Aug. 30, 2011

(54) EAR TAG APPLICATOR

(76) Inventor: Michael S. Gardner, Auckland (NZ)

Reexamination Request:
No. 90/010,921, Mar. 19, 2010

Reexamination Certificate for:
Patent No.: 5,462,554
Issued: Oct. 31, 1995
Appl. No.: 08/185,994
Filed: Mar. 31, 1994

Certificate of Correction issued May 28, 1996.

(22) PCT Filed: Jul. 31, 1992

(86) PCT No.: PCT/GB92/01416
§ 371 (c)(1),
(2), (4) Date: Mar. 31, 1994

(87) PCT Pub. No.: WO93/02549
PCT Pub. Date: Feb. 18, 1993

(30) Foreign Application Priority Data

Aug. 1, 1991 (NZ) ............................................. 239223

(51) Int. Cl.
*A01K 11/00* (2006.01)

(52) U.S. Cl. ....................................................... 606/117
(58) Field of Classification Search .................. None
See application file for complete search history.

(56) References Cited

U.S. PATENT DOCUMENTS

| 3,812,859 A | 5/1974 | Murphy et al. |
| 4,120,303 A | 10/1978 | Villa-Massone et al. |
| 4,365,411 A | 12/1982 | Muldoon |
| 4,516,577 A | 5/1985 | Scott et al. |
| 4,531,520 A | 7/1985 | Reggers et al. |
| 4,672,966 A | 6/1987 | Haas, Jr. |
| 4,716,899 A | 1/1988 | Huenefeld et al. |
| 5,154,721 A | 10/1992 | Perez |

FOREIGN PATENT DOCUMENTS

| AU | 673334 | 1/1991 |
| CA | 1131514 | 9/1982 |
| CA | 2114614 | 7/1992 |
| DE | 2840268 | 3/1980 |
| EP | 00044769 | 1/1985 |

OTHER PUBLICATIONS

Paul Davies; Response with Amendments; Dec. 20, 1994; 7 Pages; Auckland, New Zealand.
Paul Davies; Response with Amendments; Feb. 28, 1995; 7 Pages; Auckland, New Zealand.
Glenn Dawson, International Search Report PCT/NZ97/00155; Apr. 22, 1998; 5 pages; ISA/US, Washington, D.C., USA.
Glenn Dawson, International Preliminary Examination Report PCT/NZ97/00155; Nov. 16, 1998; 4 pages; IPEA/US, Washington, D.C., USA.
Michael Stuart Gardner, US Patent No. 6,235,036; File History; May 22, 2001; 191 pages; USPTO, Washington, D.C., USA.
R. Weber; Examiner's First Report on Patent Application No. 23633/92; Nov. 28, 1994; 1 Page; Australian Industrial Property Organization; Australia.
Phillips Ormonde & Fitzpatrick; Response to Office Action; Aug. 23, 1996; 6 Pages; Phillips Ormonde & Fitzpatrick, Melbourne, Australia.
Marc Berniquez; Official Action; Apr. 29, 2002; 2 Pages; Canadian Intellectual Property Office, Montreal, Canada.

(Continued)

*Primary Examiner* — David O. Reip

(57) ABSTRACT

An ear tag applicator having pivotally connected handles each having a jaw. One of the jaws has a tag engaging pin which is biased into a nearly perpendicular orientation with respect to the opposing jaw. A biasing spring allows the pin and the tag held thereby to pivot relative to the jaw at all times so that the device will not tear or rip the animals ear during its application.

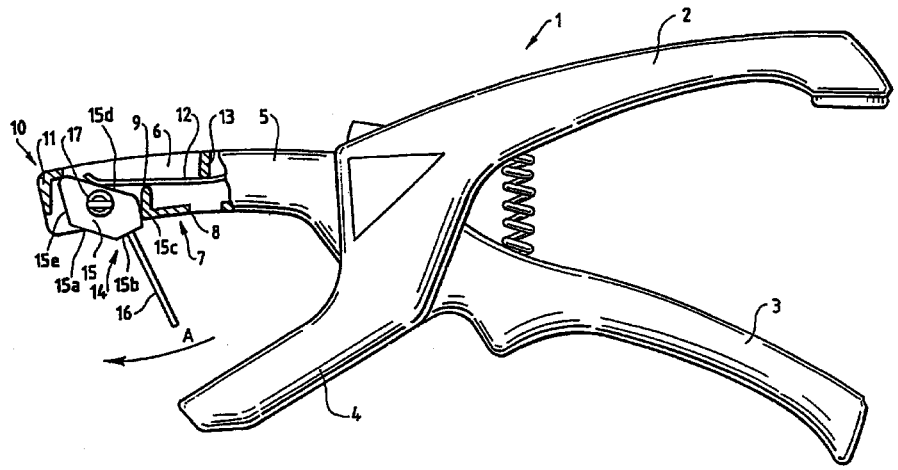

OTHER PUBLICATIONS

Figure 1:
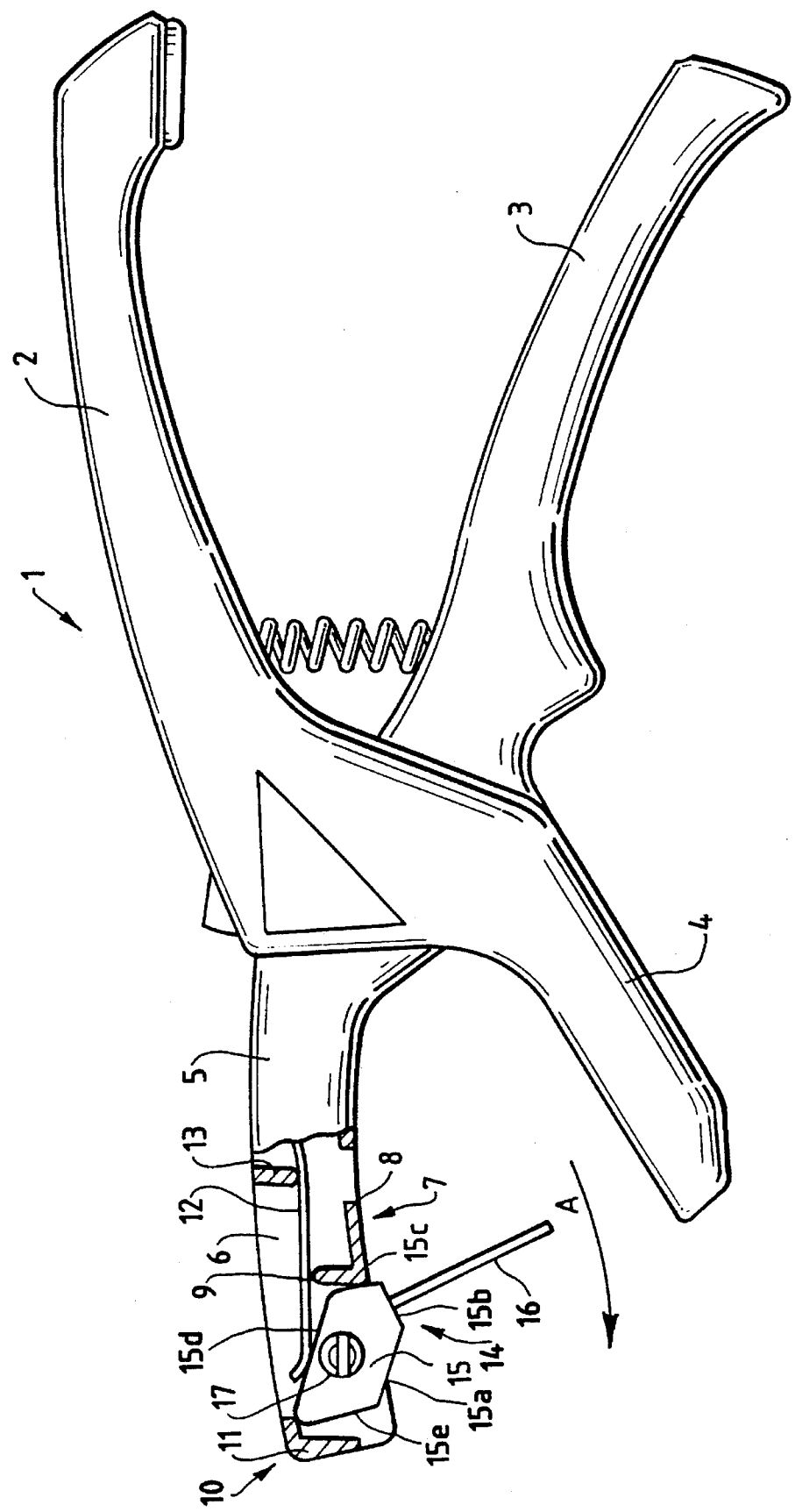
Figure 2:
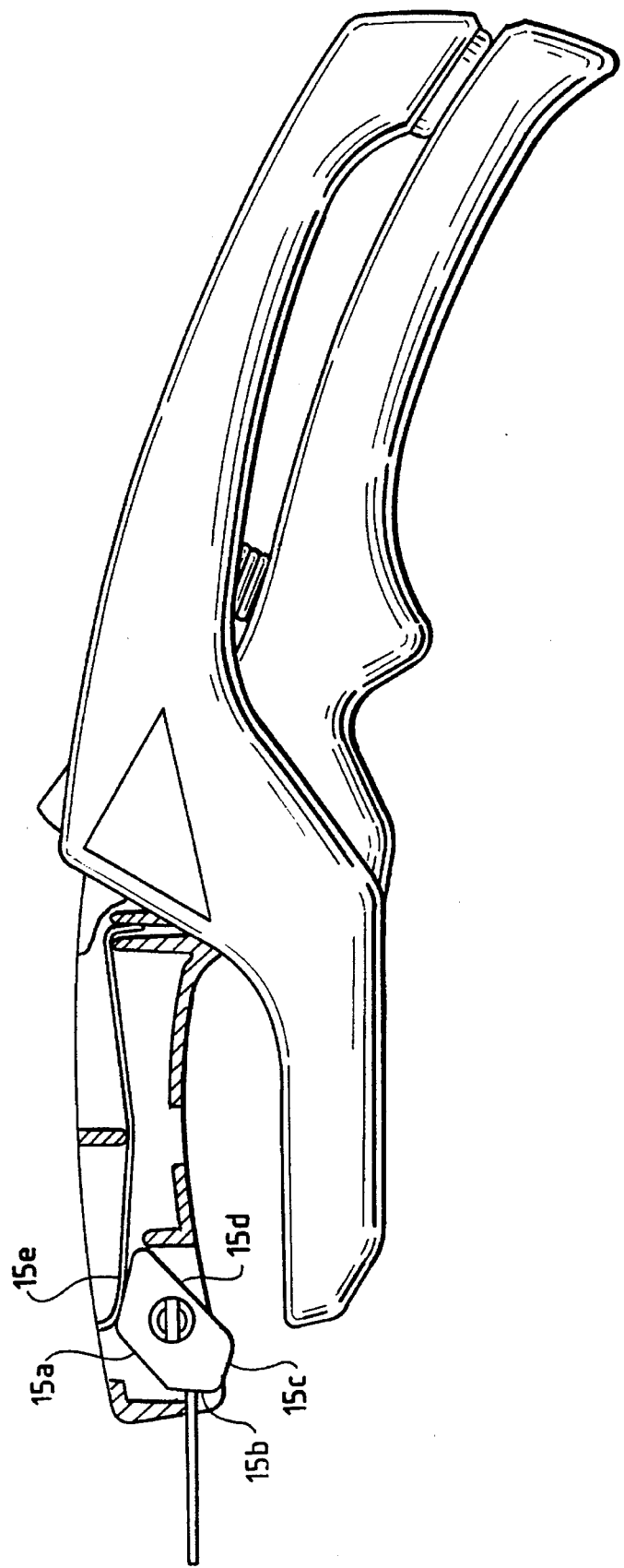

Swabey Ogilvy Renault; Amendment; Oct. 29, 2002; 12 Pages; Montreal, Canada.

Tippett/H. Burton; Official Action; Sep. 22, 1993; 2 Pages, New Zealand Patent Office, Lower Hutt, New Zealand.

Paul Davies; First Response; Dec. 20, 1994; 2 Pages; Auckland, New Zealand.

T. Robertson; Office Action; Jan. 27, 1995; 2 Pages; New Zealand Patent Office, Lower Hutt, New Zealand.

Paul Davies; Response; Feb. 28, 1995; 2 Pages; Auckland, New Zealand.

K. J. Kennett; International Preliminary Examination Report PCT/GB92/01416; Oct. 5, 1993; 4 Pages, IPEA, Gwent, Belgium.

K. J. Kennett; PCT Written Opinion PCT/GB92/01416; Jul. 19, 1993; 4 Pages; IPEA, Gwent, Belgium.

Gregory C. Dyekman, Complaint—*Y–Tex* v. *Z Tags North America & Michael Stuart Gardner,* 10CV0060–B, Apr. 2, 2010, USDC District of Wyoming.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 2 is confirmed.

Claims 1 and 3-5 are cancelled.

Claim 6 was not reexamined.

* * * * *